(12) United States Patent
Peng

(10) Patent No.: US 8,196,141 B2
(45) Date of Patent: Jun. 5, 2012

(54) METHOD AND SYSTEM FOR PLAYING DYNAMIC CONTENT

(75) Inventor: Jin Peng, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 957 days.

(21) Appl. No.: 11/573,697

(22) PCT Filed: Jul. 27, 2006

(86) PCT No.: PCT/CN2006/001868
§ 371 (c)(1),
(2), (4) Date: Feb. 14, 2007

(87) PCT Pub. No.: WO2007/036115
PCT Pub. Date: Apr. 5, 2007

(65) Prior Publication Data
US 2008/0320481 A1    Dec. 25, 2008

(30) Foreign Application Priority Data
Sep. 30, 2005    (CN) .......................... 2005 1 0107791

(51) Int. Cl.
*G06F 9/46*    (2006.01)
(52) U.S. Cl. ....................................... 718/103
(58) Field of Classification Search ................... 718/103
See application file for complete search history.

(56) References Cited

U.S. PATENT DOCUMENTS
| 6,093,880 | A | 7/2000 | Arnalds |
| 6,941,160 | B2 * | 9/2005 | Otsuka et al. ................ 455/566 |
| 6,970,641 | B1 * | 11/2005 | Pierre et al. ................... 386/239 |
| 2002/0119752 | A1 | 8/2002 | Bates et al. |
| 2002/0133530 | A1 * | 9/2002 | Koning .......................... 709/102 |
| 2003/0005056 | A1 | 1/2003 | Yamamoto et al. |
| 2003/0083106 | A1 * | 5/2003 | Seo ................................ 455/566 |
| 2003/0223604 | A1 | 12/2003 | Nakagawa |
| 2004/0083282 | A1 | 4/2004 | Shiga et al. |
| 2005/0144401 | A1 * | 6/2005 | Pantalone et al. .............. 711/151 |

(Continued)

FOREIGN PATENT DOCUMENTS
CN    1395390 A    2/2003
(Continued)

OTHER PUBLICATIONS

Foreign Communication From a Related Counterpart Application, PCT Application PCT/CN2006/001868, International Search Report dated Nov. 2, 2006, 4 pages.

(Continued)

*Primary Examiner* — Meng An
*Assistant Examiner* — Blake Kumabe
(74) *Attorney, Agent, or Firm* — Conley Rose, P.C.; Grant Rodolph

(57) ABSTRACT

A method for playing dynamic content includes: allocating and occupying playing resources for playing of dynamic contents by dynamic content priority; preempting playing resources occupied by dynamic contents of lower priorities to play back dynamic contents of higher priorities in precedence. The dynamic contents of which the playing resources are preempted can be handled as appropriate in accordance with the preset processing policy. A playing apparatus for playing dynamic content includes a content receiving module, a storage unit, a play scheduling module, a content playing module, and a user configuration module. The present invention supports automatic playing of dynamic contents by priority and in accordance with the policy preset by the user, and can be implemented simply and conveniently.

23 Claims, 4 Drawing Sheets

U.S. PATENT DOCUMENTS

2006/0135198 A1* 6/2006 Lee ............................ 455/550.1

FOREIGN PATENT DOCUMENTS

| CN | 1494261 | | 5/2003 |
|----|---------|---|--------|
| CN | 1494261 | A | 5/2004 |
| CN | 1538767 | A | 10/2004 |
| JP | 2004-88348 | | 3/2004 |
| JP | 2004088348 | A | 3/2004 |
| JP | 2004112207 | A | 4/2004 |

OTHER PUBLICATIONS

Foreign Communication From a Related Counterpart Application, PCT Application PCT/CN2006/001868, Written Opinion dated Nov. 2, 2006, 3 pages.

Open Mobile Alliance, "Dynamic Content Delivery Architecture, Approved Version 1.0," OMA-AD-DCD V1_0-20110705-A, Jul. 5, 2011, 54 pages.

Open Mobile Alliance, "Dynamic Content Delivery Technical Specification—CBS Adaptation, Approved Version 1.0," OMA-TS-DCD_CBS_Adaptation-V1_0-20110705-A, Jul. 5, 2011, 33 pages.

Open Mobile Alliance, "OMA DCD Charging, Approved Version 1.0," OMA-TS-DCD_Charging-V1_0-20110705-A, Jul. 5, 2011, 34 pages.

Open Mobile Alliance, OMA DCD Management Object, Approved Version 1.0, OMA-TS-DCD_MO-V1_0-20110705-A, Jul. 5, 2011, 17 pages.

Open Mobile Alliance, "Dynamic Content Delivery Technical Specification—Semantics and Transactions, Approved Version 1.0," OMA-TS-DCD_Semantics-V1_0-20110705-A, Jul. 5, 2011, 206 pages.

Open Mobile Alliance, "MobAd Technical Specification—DCD Adaptation, Candidate Version 1.0," OMA-TSMobAd_DCD_Adaptation-V1_0-20100126-C, Jan. 26, 2010, 33 pages.

* cited by examiner

|  | content ID | priority | current status | occupied resource ID | waited resource ID |
|---|---|---|---|---|---|
| dynamic content 1 | content ID 1 | 1 | playing | resource 1 | null |
| dynamic content 2 | content ID 2 | 2 | paused | null | resource N |
| ⋮ | …… |  |  |  | …… |
| dynamic content N | …… |  |  |  | …… |

Fig. 3

| | content ID | processing policy |
|---|---|---|
| dynamic content 1 | content ID 1 | stop |
| dynamic content 2 | content ID 2 | pause |
| ⋮ | ...... | ...... |
| dynamic content N | ...... | ...... |

Fig. 4

METHOD AND SYSTEM FOR PLAYING DYNAMIC CONTENT

FIELD OF THE INVENTION

The invention relates to a dynamic content transmission technique based on the client/server architecture, and particularly to a method and system for playing dynamic content.

BACKGROUND OF THE INVENTION

Information subscription is a communication service in communication networks, such as subscription of electronic books. The network side will distribute content to a user terminal according to the user's subscription demand. This subscription method is a simple and static subscription. In the prior art, the required content may be distributed directly when the user initiates a subscription request actively, or the required content may be distributed to the user terminal regularly according to the requirement of the user.

Dynamic content transmission is a technique for transmitting customized contents to a mobile terminal user based on the client/server architecture. There is a demand in the actual application scenarios that a server should transmit some urgent and important information to a user in time during the distribution of customized dynamic contents from the server to the user, so as to meet the requirement for a real-time and effective transmission of a dynamic content. During the process of invention, the inventor discovers that it is necessary to set priorities for the dynamic contents. If the client is playing the dynamic content of a lower priority, the playing resource should be preempted to play the dynamic content of a higher priority in time.

However, there is no applicable operating specification for transmission, receipt, and processing of dynamic contents in the prior art.

SUMMARY OF THE INVENTION

Embodiments of the invention provide a method and system for playing dynamic contents of different priorities.

The method for playing dynamic content according to an embodiment of the invention may include:

receiving and storing a first dynamic content by an apparatus for playing dynamic content;

determining whether there is any idle playing resources;

if there is an idle playing resource, playing the first dynamic content with the idle playing resource;

if no playing resource is idle and the priority of the first dynamic content is not the lowest, preempting a playing resource occupied by a second dynamic content whose priority is lower than that of the first dynamic content to play the first dynamic content;

if no playing resource is idle and the priority of the first dynamic content is the lowest, waiting until a playing resource becomes idle.

With this method, a dynamic content is played according to its priority, so that a dynamic content of higher priority may be played first; thus implementing the real-time, effective, and rational transmission of dynamic content, and improving the quality of service In the method, a highest priority processing policy list may be stored in the apparatus for playing dynamic content, to save a processing policy for processing the currently played second dynamic content when the apparatus for playing dynamic content receives a dynamic content of the highest priority;

on receiving a dynamic content of the highest priority, the highest priority processing policy list is read so as to process the currently played second dynamic content In the method, the processing policy may include one of: pausing all the currently played dynamic contents; stopping all the currently played dynamic contents; and switching the playing of all the currently played dynamic contents into a background playing mode.

In the method, an alternative policy list may be stored in the apparatus for playing dynamic content, to save the processing policy for a dynamic content when the playing resource of this dynamic content is preempted; in this case, the method further includes:

if the first dynamic content is not of the highest priority and a playing resource is to be preempted, reading the alternative policy list to process a dynamic content whose playing resource is preempted.

When the playing resource of the second dynamic content is preempted, the processing policy for the second dynamic content is distributed by a dynamic content distribution apparatus to the apparatus for playing dynamic content, or is set or modified by a user via the apparatus for playing dynamic content.

When the playing resource of the second dynamic content is preempted, the processing policy for the second dynamic content includes: pausing or stopping the playing of this dynamic content, or playing this dynamic content in background.

In the method, the processing policy for a dynamic content of lower priority whose playing resource is preempted may be defined or modified by a user so as to meet the individualized requirement of the user. In this way, it may be more flexible.

In the method, a play list may also be stored in the apparatus for playing dynamic content for saving in real time the current playing status of a dynamic content.

The process of saving in real time the current playing status of a dynamic content may include:

recording the playing status of a dynamic content waiting for playing resource as "Wait";

recording the playing status of a dynamic content occupying a playing resource currently as "Playing";

modifying the playing status of a dynamic content whose playing resource is preempted in accordance with the alternative policy list;

if a dynamic content of the highest priority is received currently, modifying the playing status of a currently played dynamic content in accordance with the highest priority processing policy list.

In the method, the apparatus for playing dynamic content adds a record in the play list when it receives a new dynamic content.

In the method, after the playing of the current dynamic content is ended, the corresponding record in the play list is deleted, and the dynamic content of the highest priority among the dynamic contents whose playing status are "Paused" or "Wait" is chosen for playing.

The play list contains at least content ID, priority, and current playing status of a dynamic content.

The play list may also store an occupied playing resource ID or a waited playing resource ID.

In the method, a received dynamic content may be stored first, so that it can be played as required when there is an idle resource, so that the playing resources may be fully utilized.

An embodiment of the present invention provides an apparatus for playing dynamic content, including: a content receiving module, a storage unit, a play scheduling module, and a content playing module;

the content receiving module is adapted to receive and store dynamic contents in the storage unit; the play scheduling module is adapted to control the received dynamic contents to occupy playing resources in an order from the highest priority to the lowest priority, and instruct the content playing module to play the dynamic contents.

The content receive module may include a dynamic content receiving/forwarding sub-module and a notifying sub-module; the play scheduling module includes a judging sub-module and a command sub-module;

the dynamic content receiving/forwarding sub-module is adapted to receive and forward a customized dynamic content to the storage unit for storage; the notifying sub-module is adapted to obtain content ID and priority information contained in the dynamic content, and send a notification message to the play scheduling module;

after the play scheduling module receives the notification message, the judging sub-module is utilized to judge whether there is an idle playing resource; if there is an idle playing resource, the command sub-module is utilized to send a playing command to the content playing module to play the currently received dynamic content by use of the idle playing resource;

if there is no idle playing resource currently, the judging sub-module is utilized to compare the priority of the currently received dynamic content with that of a dynamic content occupying a playing resource; if the priority of the currently received dynamic content is higher than that of the dynamic content occupying the playing resource, the command sub-module is utilized to send an operation command to the content playing module to preempt the playing resource and play the currently received dynamic content; if the priority of the currently received dynamic content is lower than that of the dynamic content occupying the playing resource, the currently occupied playing resource is waited to become idle.

In the apparatus, a play list may be stored in the storage unit for saving a playing status of a dynamic content;

the play scheduling module further includes a reading/writing sub-module; when the play scheduling module receives a notification message from the content playing module, if the judging sub-module determines that there is no idle playing resource currently and the occupied playing resource has to be waited to become idle, the reading/writing sub-module is utilized to record the playing status of the currently received dynamic content as "Wait" in the play list saved in the storage unit;

for the dynamic content occupying the playing resource, the reading/writing sub-module is utilized to record its playing status as "Playing" in the play list saved in the storage unit;

for the dynamic content whose playing resource is preempted, the reading/writing sub-module is utilized to modify the corresponding playing status in the play list saved in the storage unit in accordance with a preset processing policy.

An alternative policy list may be stored in the storage unit for saving a processing policy for a dynamic content in the case that the playing resource of the dynamic content is preempted;

if it is required to preempt the playing resource, the reading/writing sub-module is utilized to read the alternative policy list saved in the storage unit, and the command sub-module is utilized to send an operation command to the content playing module to process the dynamic content whose playing resource is preempted, in accordance with an obtained processing policy corresponding to the dynamic content whose playing resource is preempted.

In the apparatus, a highest priority processing policy list may also be stored in the storage unit for saving a processing policy for a currently played dynamic content when a dynamic content of highest priority is received;

after the play scheduling module receives the notification message and the judging sub-module determines that the currently received dynamic content is of highest priority, the reading/writing sub-module is utilized to read the highest priority processing policy list, and the command sub-module is utilized to send an operation command to the content playing module so as to process a currently played dynamic content.

The content playing module may include a playing execution sub-module and a status reporting sub-module;

the playing execution sub-module is adapted to receive an operation command from the command sub-module and carry out the corresponding operation for a dynamic content;

the status reporting sub-module is adapted to return an execution status report to the play scheduling module; after the play scheduling module receives the execution status report, the reading/writing sub-module is utilized to modify the playing status of a corresponding dynamic content in the play list saved in the storage unit.

After the playing of a dynamic content is ended, the status reporting sub-module is utilized to send a playing completion report to the play scheduling module;

the reading/writing sub-module in the play scheduling module is utilized to delete the record corresponding to this ended dynamic content in the play list saved in the storage unit and choose a dynamic content of highest priority among dynamic contents whose playing statuses are "Paused" or "Wait" in the play list, and the command sub-module is utilized to send a playing command to the content playing module to play the dynamic content of highest priority.

The apparatus according to an embodiment of the present invention may further include a user configuration module for setting or modifying the alternative policy list or the highest priority policy list in accordance with information input by a user.

With the above described method and apparatus, a dynamic content can be played automatically in accordance with its priority and a user-defined policy without any manual intervention, which is simple and convenient for the user.

BRIEF DESCRIPTION OF THE DRAWINGS

FIG. 3 is a schematic diagram illustrating the structure of a play list according to an embodiment of the invention;

FIG. 4 is a schematic diagram illustrating the structure of the alternative policy list according to an embodiment of the invention.

DETAILED DESCRIPTION OF THE EMBODIMENTS

Figure 1:
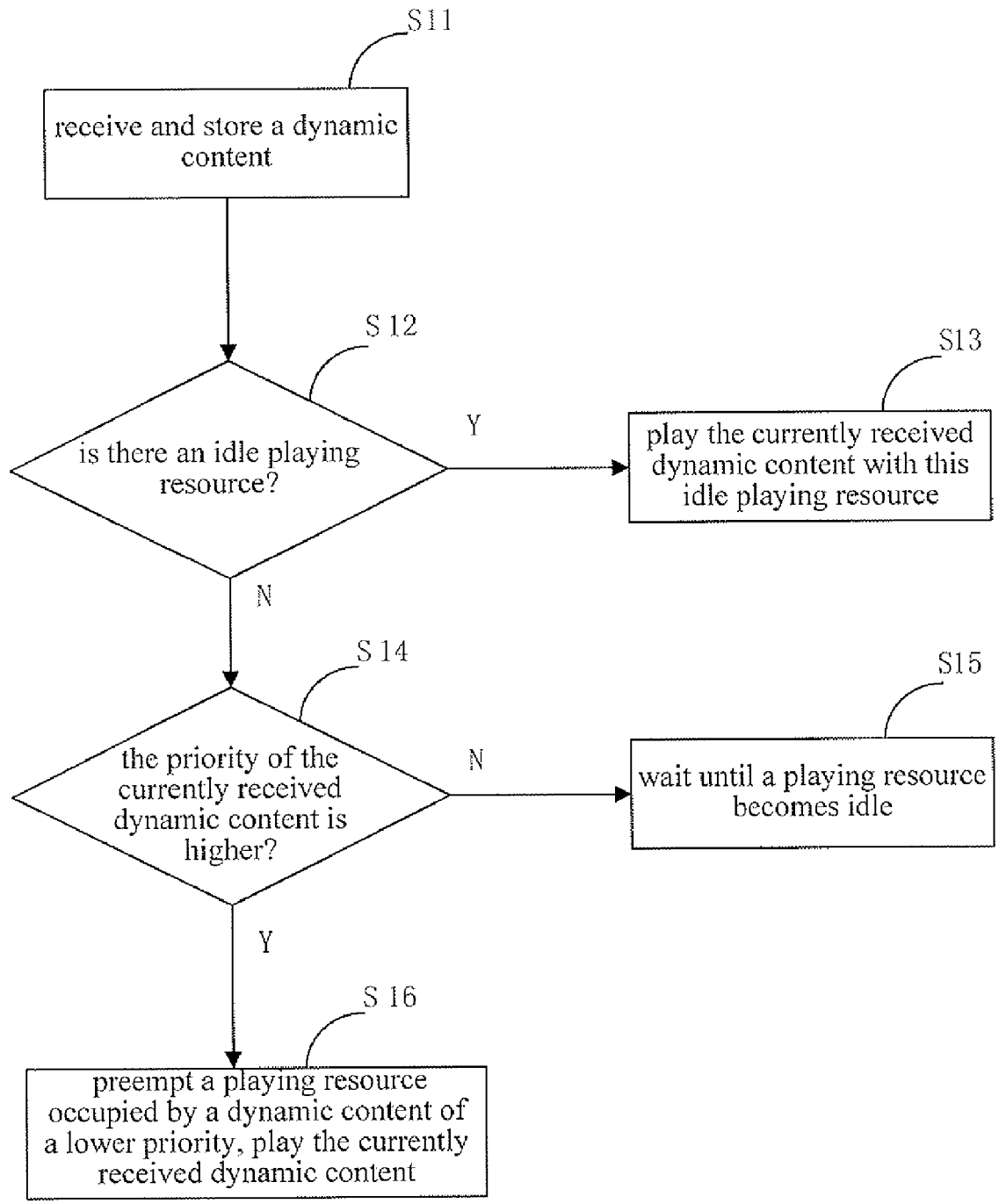
FIG. 1 is a flow diagram of a method according to an embodiment of the invention.

Refer to FIG. 1, which is a flow diagram of a method according to an embodiment of the invention. The method includes the following steps:

Step S11: an apparatus for playing dynamic content receives and stores a dynamic content;

Step S12: the apparatus for playing dynamic content determines whether there is an idle playing resource. If there is an idle playing resource, step S13 will be executed; otherwise, step S14 will be executed;

Step S13: the currently received dynamic content is played with the idle playing resource, and the process is terminated;

Step S14: the apparatus for playing dynamic content compares the playing priority of the currently received dynamic content with the playing priority of the dynamic content occupying the playing resource currently. If the playing priority of the currently received dynamic content is lower or equal to the playing priority of the dynamic content occupying the playing resource currently, step S15 will be executed; and if the playing priority of the currently received dynamic content is higher step S16 will be executed;

Step S15: the currently received dynamic content will not be played until the playing resource becomes idle; and the process will be terminated;

Step S16: the playing resource occupied by the dynamic content of lower priority is preempted, the currently received dynamic content is played, and the process will be terminated.

Figure 2:
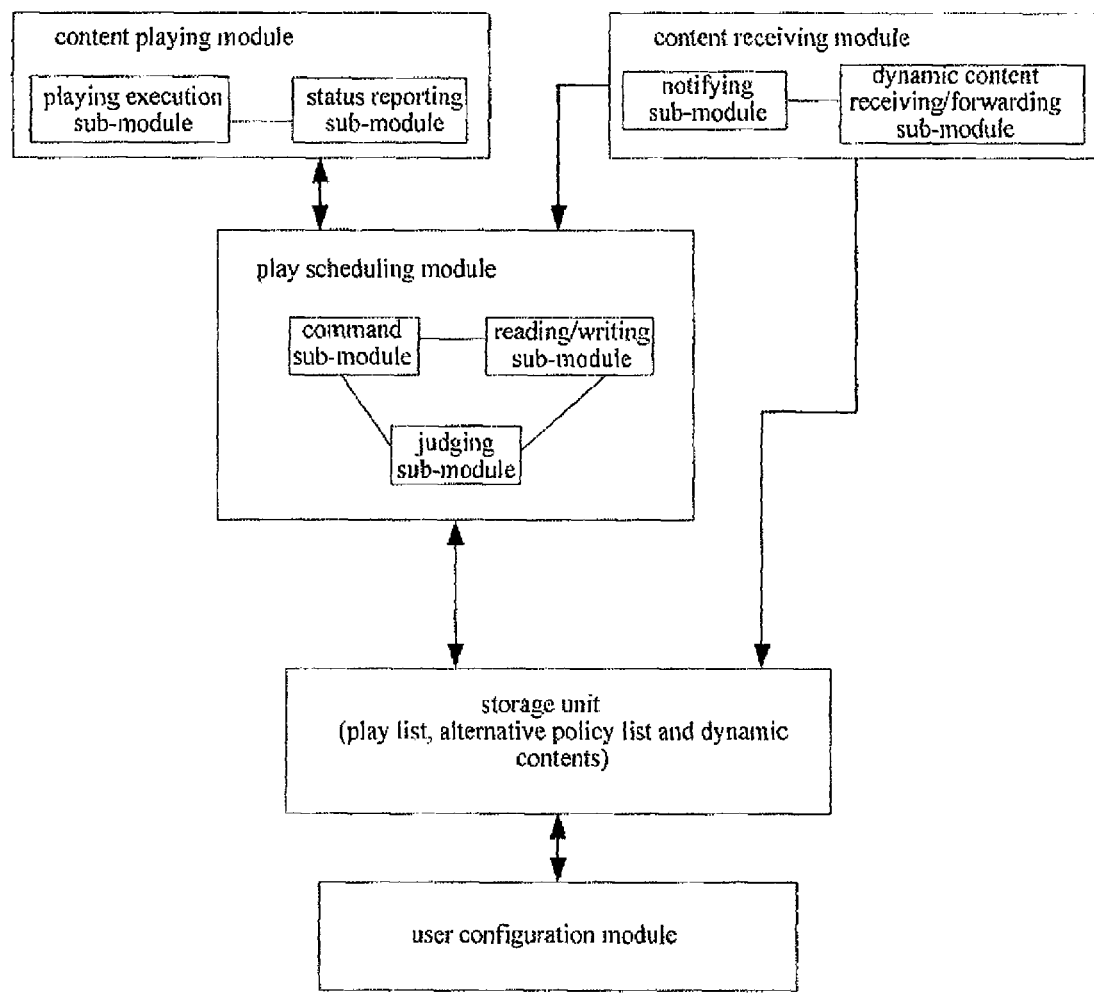
FIG. 2 is a schematic diagram illustrating the structure of an apparatus according to an embodiment of the invention.

Refer to FIG. 2, an apparatus for dynamic content playing according to an embodiment of the invention includes: a content receiving module, a storage unit, a play scheduling module, a content playing module, and a user configuration module.

Wherein, the content receiving module is adapted to receive a dynamic content sent from a dynamic content transmission server, sends the received dynamic content to the storage unit for storage, and notify the play scheduling module of the content ID and playing priority. The content receiving module includes a dynamic content receiving/forwarding sub-module and a notifying sub-module.

The dynamic content receiving/forwarding sub-module is designed to send the dynamic content received from the dynamic content transmission server to the storage unit in the content playing apparatus.

The notifying sub-module is designed to send the content ID and playing priority of the received dynamic content to the play scheduling module.

The storage unit is adapted to store the media content, a play list, and an alternative policy list. For example, the play list may be of a structure of a 2D table, as shown in FIG. 3, wherein each row represents a record of a dynamic content and may contain five fields including a content ID field, a priority field, a status field, an occupied resource ID field, and a waited resource ID field of the dynamic content. The alternative policy list may also be of a structure of a 2D table, as shown in FIG. 4, wherein each row represents a policy for processing a dynamic content in the case that playing resource of the dynamic content is preempted; each row may contain at least two fields including a content ID field and a processing policy field of the dynamic content. The processing policy, such as stopping, pausing, and switching into background mode and the like, may be preset by the user.

The play scheduling module is adapted to schedule the playing of dynamic contents according to the priorities of different dynamic contents. The play scheduling module receives a notification message from the content receiving module and receives a status report message from the content playing module. These two messages may trigger a scheduling operation. The content scheduling module carries out the scheduling in accordance with the current play list and the alternative policy list, and sends a command to the content playing module. The play scheduling module includes three sub-modules, i.e., a judging sub-module, a command sub-module, and a reading/writing sub-module.

The judging sub-module is designed to judge whether there is an available playing resource currently and to compare the priorities of dynamic contents.

The command sub-module is designed to send various operation commands to the content playing module.

The reading/writing sub-module is designed to access the play list at an appropriate time to read/write the play list or read the alternative policy list.

The content playing module is adapted to receive a command from the play scheduling module and manipulate a specified dynamic content. The content playing module includes a playing execution sub-module and a status reporting sub-module, in which the playing execution sub-module is adapted to receive an operation command, and play a dynamic content, stop or pause the playing of a dynamic content, or play a dynamic content in background; the status reporting sub-module is adapted to report the execution status of the corresponding operation command to the play scheduling module.

The user configuration module is adapted to interact with a user and read/write the alternative policy list saved in the storage unit in accordance with the user's input.

The method according to the embodiments of the invention will be detailed with reference to the structure as shown in FIG. 2.

Embodiment 1: a playing resource is idle when the apparatus for playing dynamic content receives a dynamic content.

In particular, there may be two cases:

Case 1: there is an idle playing resource and no dynamic content is being played when the content receiving module receives a dynamic content, and the idle playing resource is immediately started to play the received dynamic content;

Case 2: a dynamic content is being played and there is still idle playing resource (i.e., more than one playing resources are available in the apparatus, for example, multiple playing windows may be opened, or the like) when the content receiving module receives a dynamic content, and the dynamic content is played with the idle playing resource.

The playing method according to the embodiment 1 includes the following steps:

A1. On receiving a dynamic content, the dynamic content receiving/forwarding sub-module in the content receiving module transmits the dynamic content to the storage unit for storage. In addition, the notifying sub-module in the content receiving module sends to the play scheduling module a notification message containing the content ID and priority information of the currently received dynamic content.

B1. After the play scheduling module receives the notification message, the judging sub-module determines that there is an idle playing resource. The command sub-module sends a playing command to the content playing module, so as to utilize the idle playing resource to play the currently received dynamic content.

C1. On receiving the playing command sent from the command sub-module, the playing execution sub-module in the content playing module plays the currently received dynamic content. The status reporting sub-module returns to the play scheduling module an execution status report of the operation command. After the play scheduling module receives the execution status report, the reading/writing sub-module adds a record in the play list saved in the storage unit, e.g., (music1, low, playing, window1, null), which indicates the content ID of the dynamic content is "music1", the priority of the dynamic content is "low" (the priority may also be of other forms, for example, a digital number), the current of the dynamic content status is "playing", the ID of the playing resource occupied by the dynamic content is "window1", and the playing resource waited by the dynamic content is "null".

Embodiment 2: when the apparatus for playing dynamic content receives a dynamic content, there is no idle playing resource and the priorities of all the dynamic contents occupying the playing resources are higher than the priority of the currently received dynamic content. In this case, the currently received dynamic content should wait until a playing resource is released.

The playing method according to the embodiment 2 includes the following steps:

A2. On receiving a dynamic content, the dynamic content receiving/forwarding sub-module in the content receiving module transmits the dynamic content to the storage unit for storage. In addition, the notifying sub-module in the content receiving module sends to the play scheduling module a notification message containing the content ID and priority information of the currently received dynamic content.

B2. After the play scheduling module receives the notification message, the judging sub-module determines that no playing resource is idle currently. The reading/writing sub-module reads the play list saved in the storage unit, obtains the priorities of all the dynamic contents occupying the playing resources currently, and compares the obtained priorities with the priority of the currently received dynamic content, and finds that the priority of the currently received dynamic content is the lowest, hence the currently received dynamic content may not preempt a playing resource.

C2. The reading/writing sub-module adds a record in the play list saved in the storage unit, e.g., (music2, low, wait, null, window1), which indicates the content ID of the dynamic content is "music2", the priority of the dynamic content is "low" (the priority may also be of other forms, e.g., a digital number), the current status of the dynamic content is "wait", the ID of the playing resource occupied by the dynamic content is "null", and the playing resource waited by the dynamic content is "window1"

D2. After the playing of the dynamic content occupying the playing resource "window1" is ended, the status reporting sub-module in the content playing module sends a playing completion report to the play scheduling module. The reading/writing sub-module in the play scheduling module deletes the record corresponding to the ended dynamic content in the play list saved in the storage unit, and chooses in the play list a dynamic content of the highest priority among the dynamic contents whose statuses are "Paused" or "Wait". Suppose that only a dynamic content "music2" is waiting for playing currently, or the dynamic content "music2" has the highest priority among the dynamic contents waiting for playing, the command sub-module in the play scheduling module sends a playing command to the content playing module so as to play the dynamic content "music2".

Embodiment 3: when the apparatus for playing dynamic content receives a dynamic content, there is no idle playing resource but the priority of currently received dynamic content is between the priorities of the dynamic contents occupying the playing resources (suppose there are multiple playing resources) or is higher than the priorities of all the dynamic contents occupying the playing resources. In this case, a playing resource is to be preempted.

For example, suppose that 3 dynamic contents are occupying the playing resources currently, their priorities are Level 1, Level 2, and Level 5, respectively (suppose Level 1 is the highest and level 5 is the lowest), and the priority of the currently received dynamic content is Level 3. In this case, according to the method in this embodiment, the playing resource occupied by the dynamic content with the priority of Level 5 will be preempted, so as to play the currently received dynamic content whose priority is Level 3.

In another case, one or more dynamic contents are occupying the playing resources, and the priority of the currently received dynamic content is higher than the priorities of all the dynamic contents occupying the playing resources. In this case, according to the method in this embodiment, a playing resource will be preempted. In another embodiment, the playing resource occupied by the dynamic content with a lowest priority will be preempted, so as to play the currently received dynamic content.

The playing method according to the embodiment 3 includes the following steps:

A3. On receiving a dynamic content, the dynamic content receiving/forwarding sub-module in the content receiving module transmits the dynamic content to the storage unit for storage. In addition, the notifying sub-module in the content receiving module sends to the play scheduling module a notification message containing the content ID and priority information of the currently received dynamic content.

B3. After the play scheduling module receives the notification message, the judging sub-module determines that there is no idle playing resource. The reading/writing sub-module reads the play list saved in the storage unit, obtains the priorities of all the dynamic contents occupying the playing resources currently, compares the obtained priorities with the priority of the currently received dynamic content, and finds the priority of the currently received dynamic content is higher than the priorities of one or more dynamic contents occupying the playing resources and that some playing resource should be preempted, and determines a dynamic content whose playing resource is to be preempted.

C3. The reading/writing sub-module in the play scheduling module reads the alternative policy list stored in the storage unit, and processes in accordance with a preset processing policy saved in the alternative policy list, here this preset processing policy is for this dynamic content whose playing resource is to be preempted. For example, suppose that the playing resource occupied by a dynamic content "music1" is to be preempted in order to play the currently received dynamic content "news1", the alternative policy list will be queried to obtain the corresponding processing policy for the dynamic content "music1", i.e., (music1, pause), which indicates the processing policy for "music1" when its playing resource is preempted is "pause". The command sub-module in the play scheduling module sends an operation command PAUSE (music1, window1) to the content playing module so as to pause the playing of "music1" and release the occupied playing resource "window1", D3. After the playing execution sub-module in the content playing module carries out the pause operation, the status reporting sub-module in the content playing module sends to the play scheduling module a status report STATUS (music1, null), which indicates that the pause operation has been executed. On receiving the status report, the reading/writing sub-module in the play scheduling module modifies the record corresponding to "music1" in the play list into (music1, low, paused, null, window1), indicating that the current status of "music1" is "paused", its occupied playing resource is "null", and its waited playing resource is "window1".

E3. The command sub-module in the play scheduling module sends to the content playing module a playing command PLAY (news1, window1), indicating to play the dynamic content "news1" with the playing resource "window1". The content playing module executes this playing operation, and the status reporting sub-module in the content playing module sends a status report STATUS (news1, window1) to the play scheduling module. When the play scheduling module receives the status report, the reading/writing sub-module in the play scheduling module adds a record (news1, high, playing, window1, null) in the play list, so as to record the status of dynamic content "news1" is "playing", and the occupied playing resource of the dynamic content "news1" is "window1".

F3. When the playing of the dynamic content "news1" occupying the playing resource "window1" is ended, the status reporting sub-module in the content playing module sends a playing completion report to the play scheduling module. The reading/writing sub-module in the play scheduling module deletes the record corresponding to dynamic content "news I" in the play list, chooses a dynamic content with the highest priority among the dynamic contents whose statuses are "Paused" or "Wait" in the play list. Suppose that only the dynamic content "music1" is paused, or the dynamic content "music1" has the highest priority among the dynamic contents whose statuses are "Paused" or "Wait", the command sub-module in the play scheduling module sends to the content playing module a playing resume command RESUME (music1, window1), so as to resume the playing of the remaining content of "music1" by use of the playing resource "window1".

G3. The content playing module executes the resume operation and sends a status report STATUS (music1, window1) to the play scheduling module. On receiving the status report, the reading/writing sub-module in the play scheduling module modifies the record of "music1" saved in the play list as "(music1, low, playing, window1, null)".

Embodiment 4: on receiving a dynamic content of the highest priority, the apparatus for playing dynamic content plays the dynamic content of the highest priority in accordance with a policy in the highest priority policy list.

The playing method according to the embodiment 4 includes the following steps:

A4. On receiving a dynamic content, the dynamic content receiving/forwarding sub-module in the content receiving module transmits the dynamic content to the storage unit for storage. In addition, the notifying sub-module in the content receiving module sends to the play scheduling module a notification message containing the content ID and priority information of the currently received dynamic content.

B4. When the play scheduling module receives the notification message, the judging sub-module determines that the currently received dynamic content has the highest priority. The reading/writing sub-module in the play scheduling module reads the play list saved in the storage unit to obtain the content IDs of all the dynamic contents occupying the playing resources currently. The reading/writing sub-module reads a highest priority policy list pre-stored in the storage unit. The play scheduling module processes the currently played dynamic contents in accordance with a preset processing policy saved in the highest priority policy list. The processing policy includes: stopping all the currently played dynamic contents, or pausing all the currently played dynamic contents, or switching the playing of all the currently played dynamic contents to a background playing mode and keeping only the dynamic content of the highest priority in the foreground playing mode, so as to attract the user's attention.

In the above described embodiments, the processing policy for a dynamic content stored in the alternative policy list in the case that its playing resource is preempted and the processing policy for a currently played dynamic content stored in the highest priority policy list may be distributed to the apparatus for playing dynamic content by a dynamic content distribution apparatus. For example, a processing policy may be distributed by the dynamic content distribution apparatus, together with a dynamic content. For another example, the processing policy may also be set or modified by the user.

In summary, with the method according to the embodiments of the invention, a dynamic content may be played according to its priority, so that a dynamic content of a higher priority is played first, so as to ensure the real-time and effective transmission of the dynamic content. A dynamic content whose playing resource is preempted may be stopped, paused, or switched to a background playing mode, etc., in accordance with the setting of the user, so as to meet the individualized requirement of the user.

It is apparent that those skilled in the art may make various modifications and variations to the invention without departing from the spirit and scope of the invention. The invention is intended to cover these modifications and variations provided that they fall in the protected scope defined by the following claims or their equivalents.

What is claimed is:

1. A method for playing dynamic content, comprising:
receiving a first dynamic content by a content receiving module from a dynamic content transmission server, wherein the content receiving module sends the first dynamic content to a storage unit for storage, and notifies a play scheduling module of a content identification (ID) and a playing priority of the first dynamic content;
determining by the play scheduling module whether there is any idle playing resources based on a status report message received from a content playing module;
if there is an idle playing resource, sending a command from the play scheduling module to the content playing module to play the first dynamic content with the idle playing resource;
if there is no idle playing resource and the priority of the first dynamic content is not the lowest, preempting a playing resource occupied by a second dynamic content whose priority is lower than that of the first dynamic content to play the first dynamic content, and processing the second dynamic content according to a preset processing policy saved in an alternative policy list;
if there is no idle playing resource and the priority of the first dynamic content is the lowest, waiting until a playing resource becomes idle;
if the first dynamic content is of the highest priority, processing the second dynamic content according to a preset processing policy saved in a highest priority processing policy list.

2. The method according to claim 1, wherein the processing policy comprises one of: pausing all the currently played dynamic contents; stopping all the currently played dynamic contents; and switching the playing of all the currently played dynamic contents into a background playing mode.

3. The method according to claim 1, further comprising: storing a play list for saving in real time the current playing status of a dynamic content.

4. The method according to claim 3, wherein the process of saving in real time the current playing status of a dynamic content comprises:
recording the playing status of a dynamic content waiting for playing resource as "Wait";
recording the playing status of a dynamic content occupying a playing resource currently as "Playing"; and
modifying the playing status of a dynamic content whose playing resource is preempted in accordance with the alternative policy list.

5. The method according to claim 3, further comprising: adding a record in the play list on receiving a new dynamic content.

6. The method according to claim 3, further comprising: after the playing of a current dynamic content is ended, deleting a corresponding record in the play list, and choosing a dynamic content of highest priority among dynamic contents, the playing statuses of the dynamic contents being "Paused" or "Wait".

7. The method according to claim 3, wherein the play list contains at least one of: content ID, priority, and current playing status of a dynamic content.

8. The method according to claim 1, wherein, the processing policy comprises one of: pausing or stopping the playing of the second dynamic contents, or playing the second dynamic content in background.

9. The apparatus according to claim 8, wherein the content playing module comprises a playing execution sub-module and a status reporting sub-module,
   wherein the playing execution sub-module is adapted to receive an operation command from the command sub-module and carry out the corresponding operation for a dynamic content,
   wherein the status reporting sub-module is adapted to return an execution status report to the play scheduling module, and
   wherein after the play scheduling module receives the execution status report, the reading/writing sub-module is adapted to modify the playing status of a corresponding dynamic content in the play list saved in the storage unit.

10. The apparatus according to claim 9, wherein after the playing of a dynamic content is ended, the status reporting sub-module is adapted to send a playing completion report to the play scheduling module; the reading/writing sub-module in the play scheduling module is adapted to delete the record corresponding to the ended dynamic content in the play list saved in the storage unit and choose a dynamic content of highest priority among dynamic contents and notify the command sub-module to send a Playing command to the content playing module to play the dynamic content of highest priority, the playing statuses of the dynamic contents being "Paused" or "Wait" in the play list.

11. The method according to claim 1, further comprising: storing a play list for saving in real time the current playing status of a dynamic content.

12. The method according to claim 11, wherein the process of saving in real time the current playing status of a dynamic content comprises:
   recording the playing status of a dynamic content waiting for playing resource as "Wait";
   recording the playing status of a dynamic content occupying a playing resource currently as "Playing"; and
   if a dynamic content of the highest priority is received currently, modifying the playing status of a currently played dynamic content in accordance with the highest priority processing policy list.

13. The method according to claim 11, further comprising: adding a record in the play list on receiving a new dynamic content.

14. The method according to claim 11, further comprising: after the playing of a current dynamic content is ended, deleting a corresponding record in the play list, and choosing a dynamic content of highest priority among dynamic contents, the playing statuses of the dynamic contents being "Paused" or "Wait".

15. The method according to claim 11, wherein the play list contains at least one of: content ID, priority, and current playing status of a dynamic content.

16. The method according to claim 15, wherein the play list further comprises one of an occupied playing resource ID and a waited playing resource ID.

17. An apparatus for playing dynamic content, comprising:
   a content receiving module, a storage unit, a play scheduling module, and a content playing module,
   wherein the content receiving module is adapted to receive a first dynamic content from a dynamic content transmission server, store the first dynamic content in the storage unit, and notify the play scheduling module of a content identification (ID) and a playing priority of the first dynamic content,
   wherein the storage unit is adapted to store an alternative policy list and a highest priority processing policy list,
   wherein the play scheduling module is adapted to determine whether there is any idle playing resources based on a status report message received from the content playing module,
   wherein if there is an idle playing resource, sending a command from the play scheduling module to the content playing module to play the first dynamic content with the idle playing resource;
   wherein if there is no idle playing resource and the priority of the first dynamic content is not the lowest, preempting a playing resource occupied by a second dynamic content whose priority is lower than that of the first dynamic content to play the first dynamic content, and processing the second dynamic content according to a preset processing policy saved in the alternative policy list,
   wherein if there is no idle playing resource and the priority of the first dynamic content is the lowest, waiting until a playing resource becomes idle, and
   wherein if the first dynamic content is of the highest priority, processing the second dynamic content according to a preset processing policy saved in the highest priority processing policy list.

18. The apparatus according to claim 17, wherein the content receiving module comprises a dynamic content receiving/forwarding sub module and a notifying sub-module,
   wherein the play scheduling module comprises a judging sub-module and a command sub-module,
   wherein the dynamic content receiving/forwarding sub-module is adapted to receive and forward a customized dynamic content to the storage unit for storage,
   wherein the notifying sub module is adapted to obtain content ID and priority information contained in the first dynamic content, and send a notification message to the play scheduling module,
   wherein the judging sub-module is adapted to judge whether there is an idle playing resource, after the play scheduling module receives the notification message,
   wherein the command sub-module is adapted to send a playing command to the content playing module to play the first dynamic content by use of the idle playing resource if there is an idle playing resource,
   wherein the judging sub-module is adapted to compare the priority of the first dynamic content with that of the second dynamic content occupying a playing resource if there is no idle playing resource currently, and
   wherein the command sub-module is adapted to send an operation command to the content playing module to preempt the playing resource and play the first dynamic content if the priority of the first currently received dynamic content is higher than that of the second dynamic content occupying the playing resource; and send an operation command to the content playing module to play the first dynamic content, if the priority of the first currently received dynamic content is lower than that of the second dynamic content occupying the playing resource and the currently occupied playing resource becomes idle.

19. The apparatus according to claim 18, wherein the storage unit is further adapted to store a play list for saving a playing status of a dynamic content,
wherein the play scheduling module further comprises a reading/writing sub-module,
wherein the reading/writing sub-module is adapted to record the playing status of the first dynamic content as "Wait" in the play list saved in the storage unit, when the play scheduling module receives a notification message from the content playing module, and the judging sub-module determines that there is no idle playing resource currently and the occupied playing resource has to be waited to become idle,
wherein the reading/writing sub-module is adapted to record its playing status as "Playing" in the play list saved in the storage unit for the dynamic content occupying the playing resource, and
wherein the reading/writing sub-module is adapted to modify the corresponding playing status in the play list saved in the storage unit in accordance with a preset processing policy for the dynamic content whose playing resource is preempted.

20. The apparatus according to claim 17, wherein the content playing module comprises a playing execution sub-module and a status reporting sub module,
wherein the playing execution sub-module is adapted to receive an operation command from the command sub-module and carry out the corresponding operation for a dynamic content, and
wherein the status reporting sub-module is adapted to return an execution status report to the play scheduling module; after the play scheduling module receives the execution status report, the reading/writing sub-module is adapted to modify the playing status of a corresponding dynamic content in the play list saved in the storage unit.

21. The apparatus according to claim 20, wherein after the playing of a dynamic content is ended, the status reporting sub-module is adapted to send a playing completion report to the play scheduling module, and
wherein the reading/writing sub-module in the play scheduling module is adapted to delete the record corresponding to the ended dynamic content in the play list saved in the storage unit and choose a dynamic content of highest priority among dynamic contents and notify the command sub-module to send a playing command to the content playing module to play the dynamic content of highest priority, the playing statuses of the dynamic contents being "Paused" or "Wait" in the play list.

22. The apparatus according to claim 17, wherein the storage unit is further adapted to store a highest priority processing policy list for saving a processing policy for a currently played dynamic content when a dynamic content of highest priority is received, and
wherein the reading/writing sub-module is adapted to read the highest priority processing policy list, and the command sub-module is adapted to send an operation command to the content playing module so as to process a currently played dynamic content, after the play scheduling module receives the notification message and the judging sub-module determines that the currently received dynamic content is of highest priority.

23. The apparatus according to claim 22, further comprising a user configuration module for setting or modifying the alternative policy list or the highest priority policy list in accordance with information input by a user.

* * * * *